United States Patent
Gupta

(10) Patent No.: US 10,579,370 B2
(45) Date of Patent: Mar. 3, 2020

(54) METHOD TO DISINTEGRATE A MONOLITH SERVICE TO MICROSERVICES

(71) Applicant: EMC IP Holding Company LLC, Hopkinton, MA (US)

(72) Inventor: Shubham Gupta, Jaipur (IN)

(73) Assignee: EMC IP Company LLC, Hopkinton, MA (US)

( * ) Notice: Subject to any disclaimer, the term of this patent is extended or adjusted under 35 U.S.C. 154(b) by 0 days.

(21) Appl. No.: 16/054,285

(22) Filed: Aug. 3, 2018

(65) Prior Publication Data
US 2020/0042315 A1 Feb. 6, 2020

(51) Int. Cl.
G06F 8/72 (2018.01)
G06F 8/75 (2018.01)
G06F 8/20 (2018.01)
G06F 8/36 (2018.01)

(52) U.S. Cl.
CPC ............... *G06F 8/72* (2013.01); *G06F 8/20* (2013.01); *G06F 8/36* (2013.01); *G06F 8/75* (2013.01)

(58) Field of Classification Search
CPC .... G06F 8/00–24; G06F 8/36; G06F 8/60–77; G06F 8/20; G06F 8/72; G06F 8/75
USPC .............. 717/100–109, 120–123, 168–178
See application file for complete search history.

(56) References Cited

U.S. PATENT DOCUMENTS

| | | | | |
|---|---|---|---|---|
| 8,181,153 B2* | 5/2012 | Grechanik | ............... | G06F 8/72 717/111 |
| 8,451,483 B2* | 5/2013 | Yamada | ............... | G06F 3/1203 358/1.15 |
| 8,458,651 B2* | 6/2013 | Kurian | ............... | G06F 8/76 717/106 |
| 8,719,776 B2* | 5/2014 | Eteminan | ............... | G06F 8/34 717/106 |
| 8,813,065 B2* | 8/2014 | Zygmuntowicz | ......... | G06F 8/60 717/120 |
| 9,262,127 B2* | 2/2016 | Patrick | ............... | G06F 8/24 |
| 9,367,305 B1* | 6/2016 | Kumar | ............... | G06F 8/30 |
| 9,916,383 B1* | 3/2018 | Ching | ............... | G06F 16/316 |
| 9,977,656 B1* | 5/2018 | Mannopantar | ............ | G06F 8/20 |

(Continued)

FOREIGN PATENT DOCUMENTS

WO WO-2018197928 A1 * 11/2018 ............... G06F 8/76

OTHER PUBLICATIONS

A. Bucchiarone, N. Dragoni, S. Dustdar, S. T. Larsen and M. Mazzara, "From Monolithic to Microservices: An Experience Report from the Banking Domain," in IEEE Software, vol. 35, No. 3, pp. 50-55, May/Jun. 2018. (Year: 2018).*

(Continued)

*Primary Examiner* — Andrew M. Lyons
(74) *Attorney, Agent, or Firm* — Daly, Crowley Mofford & Durkee, LLP

(57) ABSTRACT

A method for forming at least one microservice is provided. The method includes the steps of getting a monolith application to disintegrate, scanning codes of the monolith application, finding one or more nanoservice candidates in the codes, and recommending at least one microservice to a user. Herein, the at least one microservice is a group of one or more selected nanoservice candidates sharing a common characteristic. According to an input of the user, at least one microservice selected among the at least one recommended microservice is generated.

13 Claims, 10 Drawing Sheets

(56) References Cited

U.S. PATENT DOCUMENTS

| | | | | |
|---|---|---|---|---|
| 10,114,624 | B1* | 10/2018 | Makkar | G06F 8/72 |
| 10,178,045 | B2* | 1/2019 | Kumar | H04L 47/782 |
| 10,185,601 | B2* | 1/2019 | Syed | G06F 9/541 |
| 10,198,250 | B1* | 2/2019 | Sharma | G06F 16/9024 |
| 10,338,913 | B2* | 7/2019 | Franchitti | G06F 8/65 |
| 2002/0147962 | A1* | 10/2002 | Hatanaka | G06F 8/70 |
| | | | | 717/102 |
| 2003/0214525 | A1* | 11/2003 | Esfahany | G06F 9/5061 |
| | | | | 715/700 |
| 2006/0277208 | A1* | 12/2006 | Starbuck | G06Q 10/107 |
| 2007/0179930 | A1* | 8/2007 | Wang | G06F 16/951 |
| 2007/0201655 | A1* | 8/2007 | Shenfield | G06F 8/61 |
| | | | | 379/201.01 |
| 2008/0148225 | A1* | 6/2008 | Sarkar | G06F 8/10 |
| | | | | 717/107 |
| 2008/0178147 | A1* | 7/2008 | Meliksetian | G06F 8/36 |
| | | | | 717/107 |
| 2008/0185448 | A1* | 8/2008 | Kim | F24F 11/30 |
| | | | | 236/51 |
| 2008/0244527 | A1* | 10/2008 | Chang | G06F 8/20 |
| | | | | 717/127 |
| 2010/0077351 | A1* | 3/2010 | Kaulgud | G06F 8/75 |
| | | | | 715/810 |
| 2011/0035742 | A1* | 2/2011 | Shenfield | G06F 9/44521 |
| | | | | 717/171 |
| 2011/0161911 | A1* | 6/2011 | Schultz | G06F 8/36 |
| | | | | 717/101 |
| 2011/0208788 | A1* | 8/2011 | Heller | G06F 8/10 |
| | | | | 707/810 |
| 2012/0109999 | A1* | 5/2012 | Futty | G06Q 30/06 |
| | | | | 707/769 |
| 2012/0116561 | A1* | 5/2012 | Nakagawa | G05B 19/0426 |
| | | | | 700/97 |
| 2012/0204142 | A1* | 8/2012 | Rubenstein | G06F 8/30 |
| | | | | 717/101 |
| 2013/0080996 | A1* | 3/2013 | Allam | G06F 9/5066 |
| | | | | 717/120 |
| 2013/0132366 | A1* | 5/2013 | Pieper | G06F 16/9535 |
| | | | | 707/710 |
| 2013/0304788 | A1* | 11/2013 | DeLuca | G06F 8/61 |
| | | | | 709/201 |
| 2014/0026113 | A1* | 1/2014 | Farooqi | G06F 8/34 |
| | | | | 717/107 |
| 2014/0164367 | A1* | 6/2014 | Lee | G06F 16/3322 |
| | | | | 707/723 |
| 2014/0215451 | A1* | 7/2014 | Nachtigal | G06F 9/445 |
| | | | | 717/171 |
| 2014/0337372 | A1* | 11/2014 | Lee | G06F 8/30 |
| | | | | 707/767 |
| 2015/0039360 | A1* | 2/2015 | Gowdra | G06F 8/71 |
| | | | | 705/7.12 |
| 2015/0095321 | A1* | 4/2015 | Procopio | G06F 16/24578 |
| | | | | 707/723 |
| 2015/0309813 | A1* | 10/2015 | Patel | G06F 8/75 |
| | | | | 703/22 |
| 2015/0378692 | A1* | 12/2015 | Dang | G06F 8/36 |
| | | | | 717/106 |
| 2016/0034260 | A1* | 2/2016 | Ristock | G06F 8/34 |
| | | | | 717/109 |
| 2016/0034277 | A1* | 2/2016 | Syed | G06F 8/76 |
| | | | | 717/136 |
| 2016/0072913 | A1* | 3/2016 | Baldwin | H04L 67/306 |
| | | | | 709/201 |
| 2016/0085543 | A1* | 3/2016 | Islam | G06F 8/65 |
| | | | | 717/171 |
| 2016/0124742 | A1* | 5/2016 | Rangasamy | H04L 47/70 |
| | | | | 717/103 |
| 2016/0139914 | A1* | 5/2016 | Levi | G06F 8/71 |
| | | | | 717/121 |
| 2016/0321069 | A1* | 11/2016 | Chen | G06F 8/75 |
| 2017/0061016 | A1* | 3/2017 | Lytkin | G06F 16/9535 |
| 2017/0193021 | A1* | 7/2017 | Deng | G06F 16/2228 |
| 2017/0242661 | A1* | 8/2017 | Koreki | G06F 9/44 |
| 2017/0256265 | A1* | 9/2017 | Lee | H04M 1/72552 |
| 2017/0364434 | A1* | 12/2017 | Kairali | G06F 11/3668 |
| 2018/0068371 | A1* | 3/2018 | Krishnamurthy | G06F 17/276 |
| 2018/0069806 | A1* | 3/2018 | Kumar | H04L 47/782 |
| 2018/0081740 | A1* | 3/2018 | Syed | G06F 8/76 |
| 2018/0101363 | A1* | 4/2018 | Periadurai | G06F 8/316 |
| 2018/0113799 | A1* | 4/2018 | M.V. | G06F 11/3684 |
| 2018/0136931 | A1* | 5/2018 | Hendrich | G06F 11/302 |
| 2018/0146047 | A1* | 5/2018 | Biswas | H04W 4/38 |
| 2018/0189038 | A1* | 7/2018 | Hart | G06F 8/76 |
| 2018/0189039 | A1* | 7/2018 | Hart | G06F 8/76 |
| 2018/0196643 | A1* | 7/2018 | Dolby | G06F 8/36 |
| 2018/0217830 | A1* | 8/2018 | Bartolotta | G06F 8/61 |
| 2018/0225110 | A1* | 8/2018 | Borlick | G06F 8/72 |
| 2018/0336207 | A1* | 11/2018 | Dunne | G06F 16/35 |
| 2018/0349121 | A1* | 12/2018 | Bagarolo | G06F 11/302 |
| 2018/0357055 | A1* | 12/2018 | Apte | G06F 8/73 |
| 2018/0365008 | A1* | 12/2018 | Chandramouli | G06F 8/76 |
| 2018/0373765 | A1* | 12/2018 | Kaliavaradhan | G06F 16/28 |
| 2019/0079741 | A1* | 3/2019 | Makkar | G06F 8/33 |
| 2019/0108067 | A1* | 4/2019 | Ishikawa | H04L 41/5041 |
| 2019/0138678 | A1* | 5/2019 | Young | G06F 8/33 |
| 2019/0179894 | A1* | 6/2019 | Anerousis | G06F 17/2785 |
| 2019/0197448 | A1* | 6/2019 | Nelaturi | G06Q 10/06315 |
| 2019/0250912 | A1* | 8/2019 | Gavisiddappa Kodigenahalli | H04L 67/10 |

OTHER PUBLICATIONS

L. Chen, "Microservices: Architecting for Continuous Delivery and DevOps," 2018 IEEE International Conference on Software Architecture (ICSA), Seattle, WA, 2018, pp. 39-397. (Year: 2018).*

M. T. Gamble and R. Gamble, "Monoliths to Mashups: Increasing Opportunistic Assets," in IEEE Software, vol. 25, No. 6, pp. 71-79, Nov.-Dec. 2008. (Year: 2008).*

Knoche and W. Hasselbring, "Using Microservices for Legacy Software Modernization," in IEEE Software, vol. 35, No. 3, pp. 44-49, May/Jun. 2018. (Year: 2018).*

A. Premchand and A. Choudhry, "Architecture Simplification at Large Institutions using Micro Services," 2018 International Conference on Communication, Computing and Internet of Things (IC3IoT), Chennai, India, 2018, pp. 30-35. (Year: 2018).*

F. Rademacher, S. Sachweh and A. Zundorf, "Differences between Model-Driven Development of Service-Oriented and Microservice Architecture," 2017 IEEE International Conference on Software Architecture Workshops (ICSAW), Gothenburg, 2017, pp. 38-45. (Year: 2017).*

Sarita and S. Sebastian, "Transform Monolith into Microservices using Docker," 2017 International Conference on Computing, Communication, Control and Automation (ICCUBEA), Pune, 2017, pp. 1-5. (Year: 2017).*

R. Chen, S. Li and Z. Li, "From Monolith to Microservices: A Dataflow-Driven Approach," 2017 24th Asia-Pacific Software Engineering Conference (APSEC), Nanjing, 2017, pp. 466-475. (Year: 2017).*

C. Fan and S. Ma, "Migrating Monolithic Mobile Application to Microservice Architecture: An Experiment Report," 2017 IEEE International Conference on AI & Mobile Services (AIMS), Honolulu, HI, 2017, pp. 109-112. (Year: 2017).*

G. Mazlami, J. Cito and P. Leitner, "Extraction of Microservices from Monolithic Software Architectures," 2017 IEEE International Conference on Web Services (ICWS), Honolulu, HI, 2017, pp. 524-531. (Year: 2017).*

* cited by examiner

METHOD TO DISINTEGRATE A MONOLITH SERVICE TO MICROSERVICES

TECHNICAL FIELD

This disclosure generally relates to a method for generating microservices and more particularly to a method for disintegrating a monolith into microservices.

BACKGROUND

A Microservice is a software architectural design pattern that structures an application as a collection of loosely coupled services. The Microservices Architecture is a variant of the service-oriented architecture (SOA) focusing on fine-grained services and lightweight protocols. The value of the Microservice Architecture may be achieved through decomposing large, monolithic legacy applications into a set of small independent, composable services that each can be accessed.

These individual small independent, composable services are called as Nanoservices. A Nanoservice is a service that is broken down into very small pieces. However, not all very small pieces of code are nanoservices. A Nanoservices must be deployable, reusable, and useful. When a service or a method does not call other internal method but calls an external service such as a web service or a database interface, it is considered as a Nanoservice. A number of Nanoservices may be grouped according to the characteristics of the Nanoservices (e.g., a common keyword) to form a Microservice.

The Microservices Architecture enables individual services to be deployed and scaled independently (typically via containers), worked on in parallel by different teams, built in different programming languages, and have their continuous delivery and deployment flows. As the development companies move towards cloud-native approaches, it is needed to disintegrate their existing monoliths into microservices, which are beneficial because developers of the companies can work independently and can communicate together. The companies realize that they can achieve the same results with microservices as the monolith applications but with better efficiency and resiliency.

However, even though there have been efforts to implement Microservices by disintegrating monolith applications, there has been no solution available to perform the service automatically. Accordingly, a new solution for disintegrating a Monolith application into Microservices that requires less effort and time is required.

SUMMARY

The concepts, systems, and techniques disclosed herein are directed toward a method and an apparatus for disintegrating a monolith application into one or more microservices. Such a method may reduce the time and effort to disintegrate a monolith application into microservices and provide improved code quality and consistency even though the work is done by multiple teams or in multiple sessions.

According to one illustrative embodiment, a method for forming at least one microservice may include the steps of: getting a monolith application to disintegrate; scanning codes of the monolith application; finding one or more nanoservice candidates in the codes; recommending at least one microservice to a user. Herein, the at least one microservice may be a group of one or more selected nanoservice candidates sharing a common characteristic. According to an input of the user, at least one microservice selected among the at least one recommended microservice is generated.

In one variation of the illustrative embodiment, the step of finding one or more nanoservices may further include: finding one or more methods in the codes of the monolith application; determining whether each of the one or more methods references an internal method; storing a method, when the method does not call an internal method, into a reference array; determining whether each of the methods in the reference array calls an external service; storing a method, when the method calls an external service, into a nanoservice array.

In one variation of the illustrative embodiment, the external service may include a web service, a database interface, or a network protocol.

In one variation of the illustrative embodiment, the step of recommending at least one microservice may further include: finding keywords in names of the nanoservice candidates; for each of the found keywords, determining whether a keyword exists in a keyword array; inserting, if the keyword does not exist in the keyword array, the keyword into the keyword array or increasing, if the keyword exists in the keyword array, a number of occurrences for the keyword in the keyword array; selecting at least one keyword as the selected keyword, wherein the number of occurrences for the selected keyword is greater than a predetermined number; and recommending the at least one microservice by grouping one or more selected nanoservices having the selected keyword.

In one variation of the illustrative embodiment, the method for forming at least one microservice may further include: removing one or more rows from the table, wherein each of the rows has a generic method as its key.

In one variation of the illustrative embodiment, the method for forming at least one microservice may further include: removing codes in the monolith application corresponding to the at least one generated microservice.

In one variation of the illustrative embodiment, the method for forming at least one microservice may further include: proving a user interface with which a user selects at least one microservice among the at least one recommended microservice.

In one variation of the illustrative embodiment, the method for forming at least one microservice may further include: adding one or more generic microservice features to the at least one generated microservice. Herein, the one or more generic microservice may include at least one of: automatic deployment of the generated microservice, interfacing a database; performing a service health check; enabling exception handling; logging activities of the generated microservice; providing performance data of the generated microservice; or providing automatic document generation.

In one variation of the illustrative embodiment, the step of getting a monolith application may further include: getting a name of the monolith application and a location of the monolith application codes.

According to another illustrative embodiment, an apparatus for forming at least one microservice may include a processor and a memory. Herein, the processor may be configured to: get a monolith application to disintegrate; scan codes of the monolith application; find one or more nanoservice candidates in the codes; recommend at least one microservice to a user, wherein the at least one microservice is a group of one or more selected nanoservice candidates sharing a common characteristic; and generate at least one microservice according to input of the user.

In one variation of the illustrative embodiment, the apparatus may further include: a user interface with which a user selects at least one microservice among the at least one recommended microservice.

In one variation of the illustrative embodiment, the apparatus may further include: a user interface with which a user selects at least one generic microservice feature to be added to the at least one generated microservice.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

Figure 1:
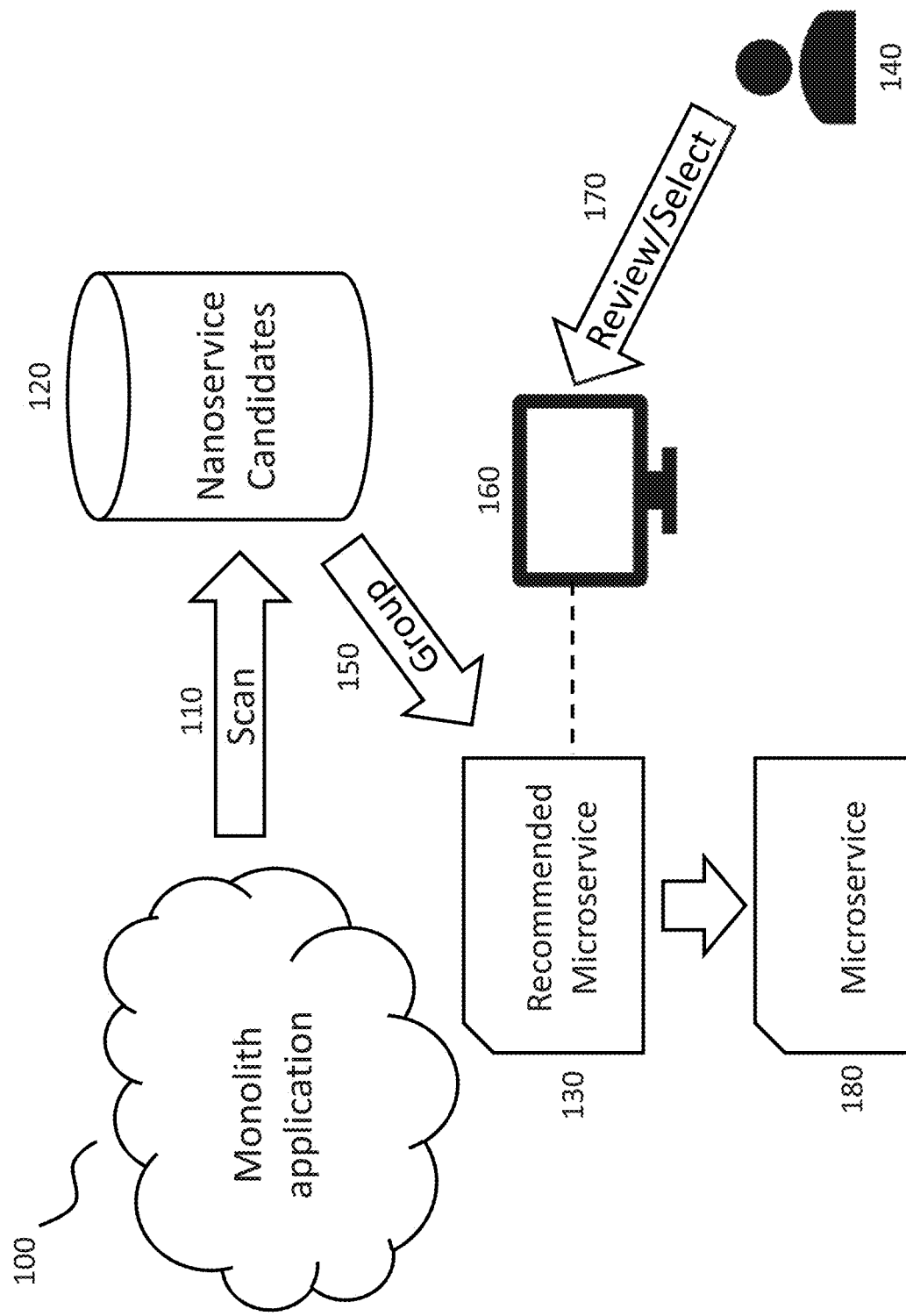
FIG. 1 is an illustrative diagram showing a generic model of disintegrating a monolith application into microservices according to the concepts described herein.

All relative descriptions herein, such as left, right, up, and down, are with reference to the figures, and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing example features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

For convenience, certain introductory concepts and terms used in the specification are collected here.

As used herein, the term "monolith application" or "monolithic application" is used to describe a single-tiered tightly-coupled software application in which various elements of software architecture, such as user interface, database access, processing logic, and the like are combined into a single program usually on a single platform. In software engineering, a monolith application describes a software application which is designed without modularity. Modularity of software elements in software architecture is desirable, in general, as it supports reuse of parts of the application logic and also enables efficient maintenance of the individual elements by allowing repair or replacement of elements of the application without requiring upgrading whole application.

As used herein, the term "nanoservice" is used to describe a small, individual, and stand-alone piece of software. However, not all very small pieces of code are considered as nanoservices. A nanoservices may be deployable, reusable, and useful. When a service or a method does not call other internal method but calls an external service such as a webservice or a database interface, it is considered as a nanoservice.

As used herein, the term "microservice architecture" or simply "microservice" is used to describe an approach to developing a single application as a suite of small services. A Microservice usually runs on its own process and communicates with other systems or services through a lightweight mechanism. The lightweight mechanism used by the Microservice includes an HTTP resource API or communication API provided by an external system. A number of Nanoservices may be grouped together according to the characteristics of the Nanoservices (e.g., a sharing keyword) to form a Microservice. The grouping of Nanoservices to form a Microservices may be for implementing a business capability or a functional capability. In addition, the Microservice may be independently deployable by a fully automated deployment mechanism.

Referring now to FIG. 1, an illustrative diagram showing a generic model of disintegrating a monolith application 100 into microservices 180 is described according to the concepts herein. First, a monolith application 100 to be disintegrated is selected by a user. The monolith application 100 may be implemented using various architecture or various programming language. For example, the monolith application 100 may be written in C#, Python, Java or any other languages. The monolith application 100 may be on a single platform but may be divided on different platforms. In this case, each part of the monolith application 100 may have the same characteristics as the general monolith application.

Figure 6:
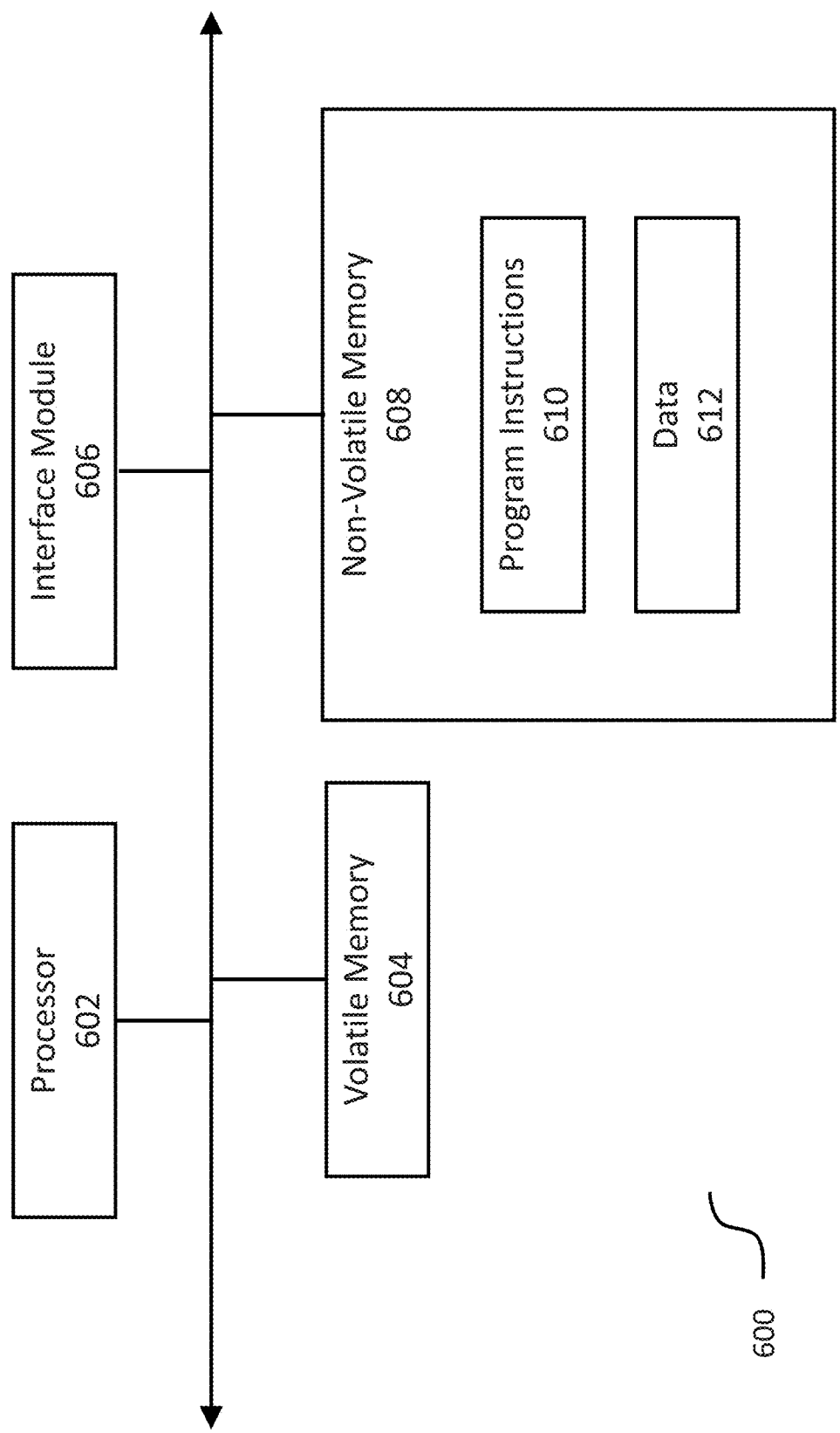
FIG. 6 is a block diagram of an exemplary implementation of a processing device to implement the methods described in FIGS. 2-4 according to the concepts described herein.

A software system ("disintegration system") that disintegrates the monolith application 100 into microservices 180 receives the monolith application 100. The disintegration system (600 as shown in FIG. 6) may receive a name and a location for the monolith 100 and may fetch the code of the monoliths. Alternately, the system 600 may receive one or more files consisting of the monolith 100. As can be appreciated by those of ordinary skill in the pertinent art, one or more different methods may be used to get the codes of the monolith 100.

The system 600 may scan 110 the codes of the monolith 100 to find candidates for nanoservices. The system 600 stores the nanoservice candidates into a repository 120, such as an array, a table, or a database. The process of finding nanoservice candidates are described in detail in the process 300 in FIG. 3. Each nanoservice may have one or more keywords. For example, there may be nanoservice candidates with names of GetUsername, GetOrdernumber, GetOrdernumberByState, and GetOrdernumberByUsername. In this case, 'Username,' 'State' and 'Ordernumber' may be considered as keywords. The generic term, such as 'Get,' 'Update,' or 'Delete' is not considered as a keyword for this purpose. The system 600 may have a dictionary that defines what term is considered as a generic term.

Then, the system 600 recommends one or more microservices 130 to the user 140 through a user interface 160. Microservices may be generated according to shared characteristics by grouping 150 a plurality of nanoservices having a common characteristic. For example, out of those four nanoservice candidates, a microservice containing services for 'Username,' a microservice containing services for 'Ordername,' and a microservice containing services for 'State' may be generated. The system 600 may use predefined criteria to determine what microservice is recommended to the user 140. For example, the application only recommends microservice with a keyword that two or more nanoservices have the keyword. In this case, microservices for 'Ordername' and 'Username' are recommended to the user. However, a microservice for keyword 'State' is not recommended because this keyword is used only once. Alternately, the system 600 may show all possible microservices and let the user review and select 170 what microservice is generated. In some embodiments, the application may show the number of occurrences for each of the keywords. In other embodiments, the application may order recommended microservices according to the occurrences of corresponding keywords.

When the user 140 chooses 170 one or more microservices 130 to generate through the user interface 160, the application generates the one or more microservices 180. The system 600 may add codes for generic functionalities of the microservices to the generated microservice 180. For example, the system 600 may add features for automatic deployment of the microservices or an interface to a database that can be shared by the nanoservices in the microservice. Particularly, the system 600 may add additional microservices features during code generation includes: service health check; exception handling; application logging; enabling application insights (performance data of the generated microservice); providing automatic document generation via swagger, and the like. As can be appreciated by those of ordinary skill in the pertinent art, the system 600 may add other codes that are needed by any microservice. In some embodiments, the system 600 may perform one or more post-generation cleanup procedures including removing corresponding codes from the monolith application 100 for a generated microservice.

Figure 2:
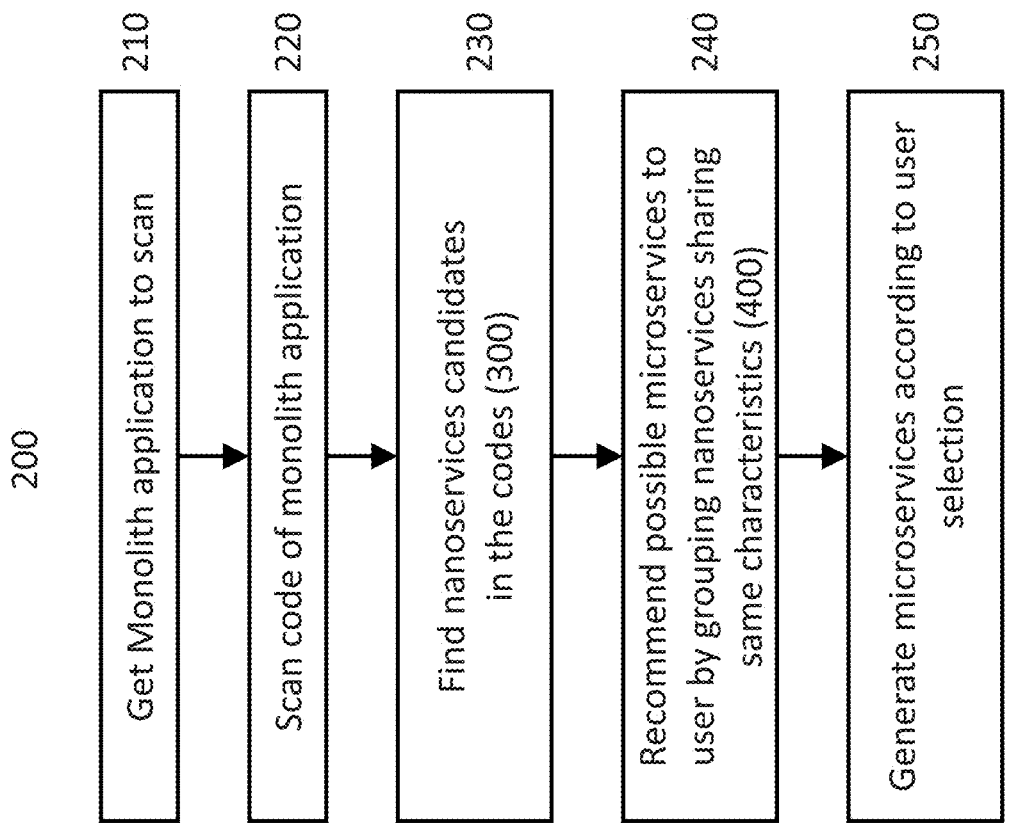
FIG. 2 is a flowchart for disintegrating a monolith application into microservices according to the concepts described herein.

Referring now to FIG. 2, a flowchart 200 for disintegrating a monolith application into microservices is described according to the concepts herein. In step 210, the system 600 may get a monolith application 100 to be disintegrated. The system 600 may receive a name and a location for the monolith 100 and fetches the code of the monoliths. Alternately, the system 600 may receive one or more files consisting of the monolith 100. As can be appreciated by those of ordinary skill in the pertinent art, one or more different methods may be used to get the codes of the monolith 100.

In step 210, the system 600 may scan the codes of the monolith 100 to find candidates for nanoservices. Nanoservices is a small, individual, and stand-alone method. If a method calls another method which is not a nanoservice, the method cannot be a nanoservice. Further, if a method is not referenced by another method in the codes, it may not be worthwhile to make the method as a nanoservice. As the system 600 scans the codes, it may look for methods that are referenced or called by another method. If a method is referenced by another method, the system 600 adds the method name into a referenced array. In step 230, if the method does not call another internal method but calls an external service, the method becomes a candidate of nanoservice. The procedure executed in step 230 is described in detail in flowchart 300 in FIG. 3.

In step 240, the system 600 may recommend possible microservices to the user 140. The system 600 groups possible nanoservices by one or more keywords. These keywords are from the names of the nanoservice candidates. Each nanoservice may have one or more keywords. For example, there may be nanoservice candidates with names of GetUsername, GetOrdernumber, GetOrdernumberByState and GetOrdernumberByUsername. In this case, 'Username,' 'State' and 'Ordernumber' may be considered as keywords. The generic term, such as 'Get,' 'Update,' or 'Delete' are not considered as a keyword for this purpose. The system 600 may have a dictionary that defines what term is considered as a generic term.

When the user 140 chooses one or more microservices to generate through the user interface 160 in step 240, the system 600 generates the one or more microservices 180 in step 260. The system 600 may add codes for generic functionalities of the microservices. For example, the system 600 may add codes for automatic deployment of the microservices or an interface to a database that can be shared by the nanoservices in the microservice. As can be appreciated by those of ordinary skill in the pertinent art, the system 600 may add other codes that are needed by any microservice.

Figure 3:
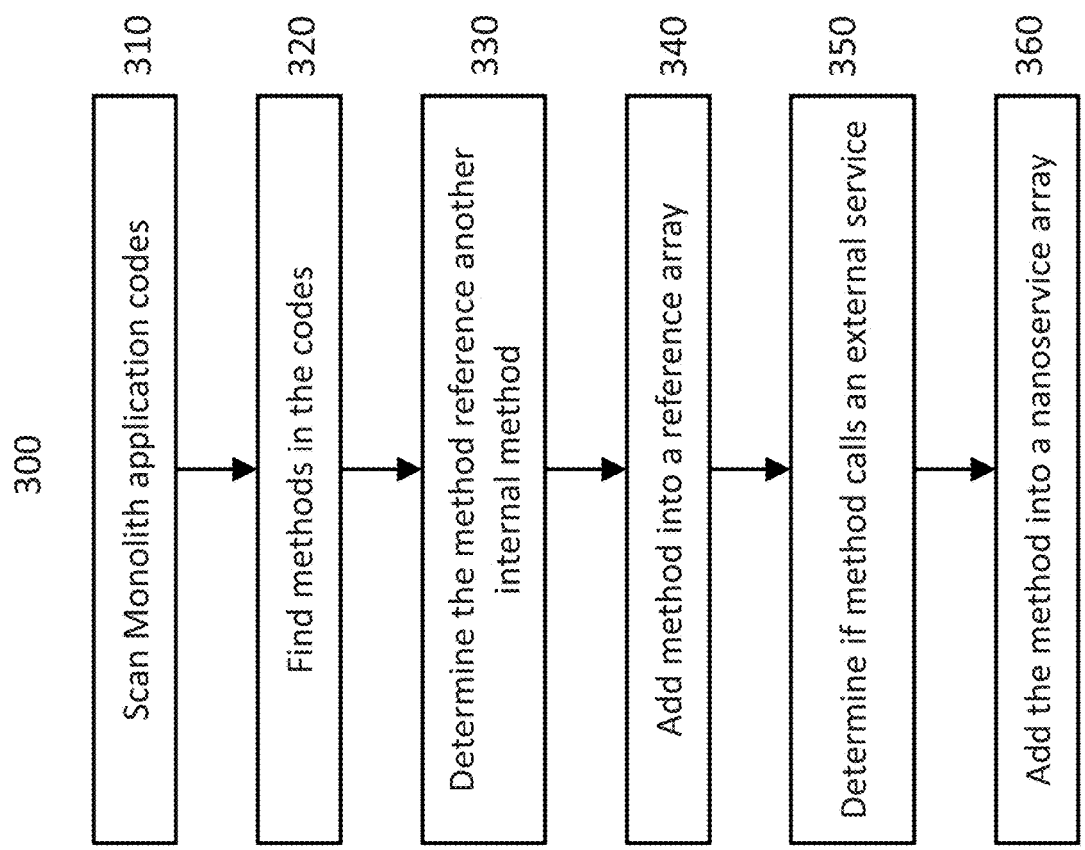
FIG. 3 is a flowchart for finding nanoservice candidates in the monolith application according to the concepts described herein.

Referring now to FIG. 3, a flowchart 300 for finding nanoservice candidates in the monolith application is described according to the concepts herein. In step 310, the system 600 scans the monolith application codes to find nanoservice candidates. In step 320, the system may find methods in the codes. The system may use pre-defined general method syntax to compare the codes of monolith application to find methods. For example, if the monolith application is written in Java, the system 600 may determine that a method is found when it encounters codes with the format of <modifier> <return type> <method name>(parameters . . . ) { . . . }. For other languages, an appropriate general method syntax may be used to find one or more methods in the monolith codes.

In step 320, the system 600 may scan inside of the method to determine whether the method references or calls another internal method. If the method calls another method which is defined internally in the monolith application, it means that the method has a dependency on another method and the method cannot be a nanoservice, which is individual and stand-alone. If the method does not call another internal method, the system adds the methods into a reference array in step 330. The reference array is a repository to store methods (method name and its codes).

In step 360, the system 600 determines whether a method calls an external service. If a method does not call another internal method but calls an external service, the method becomes a candidate of nanoservice. An external service may be a method to call a web service, a database interface to fetch or insert data into a database, or a network protocol to transmit data over a network. As can be appreciated by those of ordinary skill in the pertinent art, there may be other external services such that a method calling the external service is considered a nanoservice candidate. When it is determined that a method does not call another internal method and calls an external service, the system 600 stores the method into a nanoservice array 520 in FIG. 5.

Figure 4:
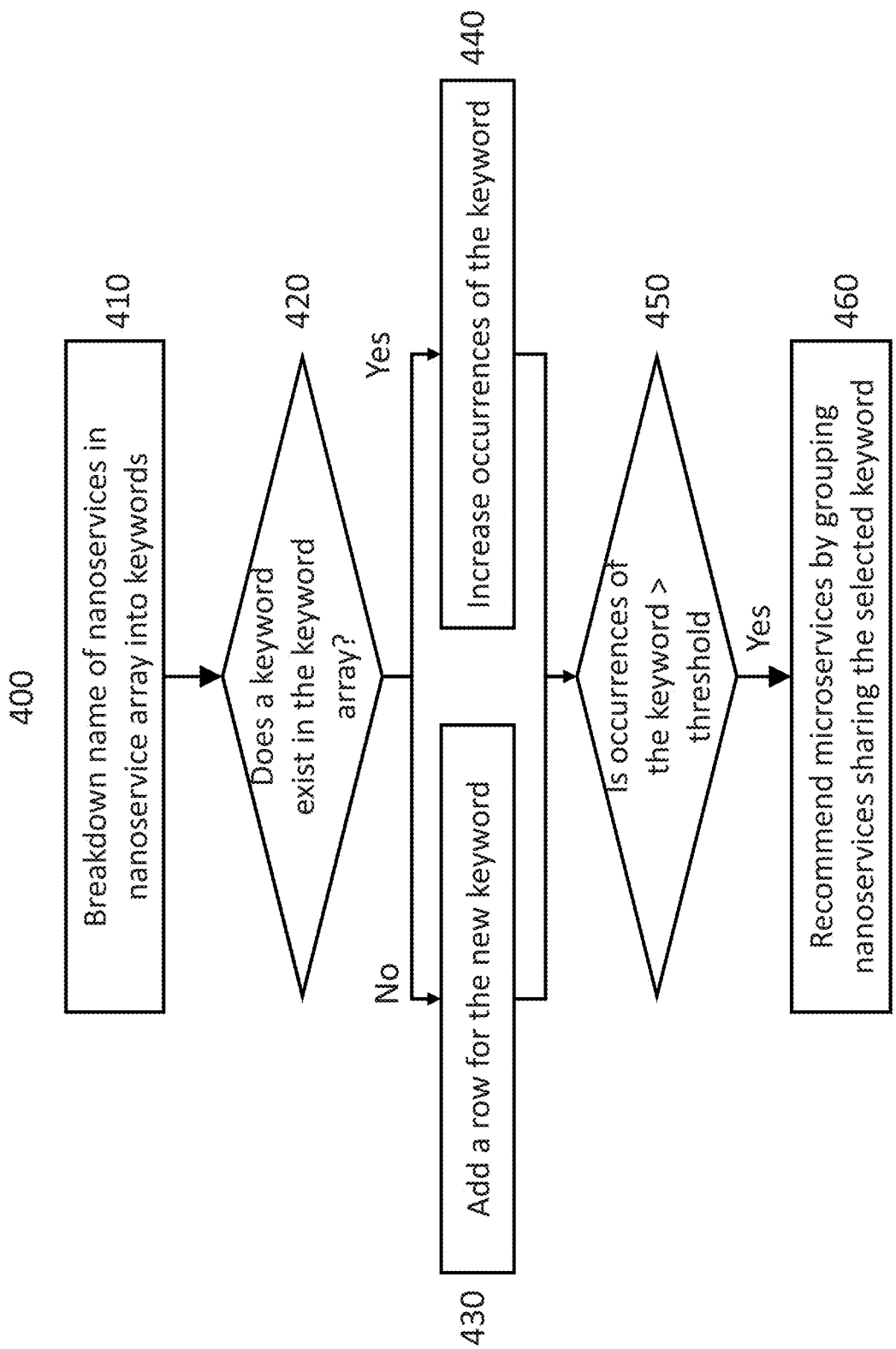
FIG. 4 is a flowchart for generating microservices from nanoservices according to the concepts described herein.

Referring now to FIG. 4, a flowchart 400 for generating microservices from nanoservices is described according to the concepts described herein. In step 410, the system 600 may scan the names of nanoservice candidates in the nanoservice array 520. Then, the system 600 may break down the names into one or more keyword. For example, there may be nanoservice candidates with names of GetUsername, GetOrdernumber, GetOrdernumberByState and GetOrdernumberByUsername. In this case, 'Username,' 'State' and 'Ordernumber' may be considered as keywords. The generic term, such as 'Get,' 'Update,' or 'Delete' are not considered as a keyword for this purpose. The system 600 may have a dictionary that defines what term is considered as a generic term.

Figure 5:
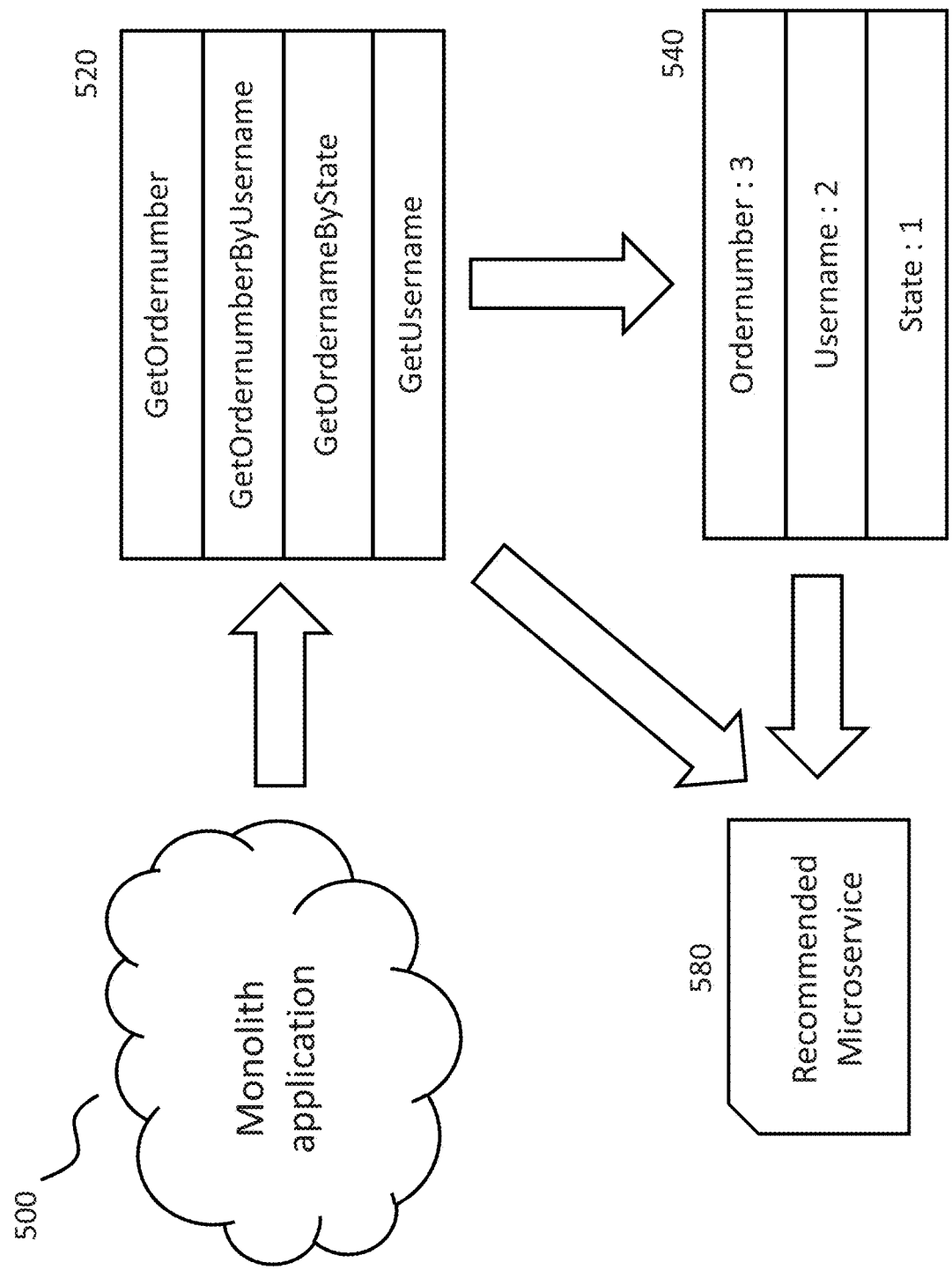
FIG. 5 is an illustrative diagram showing a conceptual data flow for disintegrating a monolith application into microservices according to the concepts described herein.

In step 420, the system 600 may compare the rows of the keyword array 540 in FIG. 5 with a keyword found in the names of the nanoservice candidates. For example, the system 600 may find a keyword 'username' in the keyword array 540. If the array does not have the keyword "username," the system 600 may add the keyword into the array with an initial occurrence of 1 (step 430). If the array already has the keyword, the system 600 may increase the occurrence for the keyword (step 440). This keyword array 540 may be implemented as a structure in volatile memory 604 such as RAM or a table in a database that is stored in a non-volatile memory 608. As can be appreciated by those of ordinary skill in the pertinent art, the system 600 may implement the keyword array using various technologies which is available.

In step 450, once the names of all nanoservices candidates are broken down into the keywords, the system may check the number of occurrences for each keyword. If a keyword is used more than a predetermined number or a threshold, the system 600 may recommend a microservice to a user by grouping nanoservice candidates sharing the keyword (step 460). For example, out of those four nanoservice candidates, a microservice containing services for 'username,' a microservice containing services for 'ordername,' and a microservice containing services for 'state' may be generated. If the application recommends microservice with a keyword that two or more nanoservices have the keyword, the system may recommend microservices for 'ordername' and 'username' to the user. Alternately, the system 600 may show all possible microservices and let the user choose what microservice is generated. In some embodiments, the application may show the number of occurrences for each of the keywords. In other embodiments, the application may order recommended microservices according to the occurrences of corresponding keywords.

Referring now to FIG. 5, an illustrative diagram showing a conceptual data flow for disintegrating a monolith application into microservices is described according to the concepts described herein. The codes of a monolith application 500 may be scanned by the disintegration system 600 and one or more nanoservice candidates may be stored in a nanoservice array 520. The system 600 may scan the names of nanoservice candidates in the nanoservice array 520 and may find keywords in the names. Then the system 600 may store the keywords and the number of occurrences of each of the keywords into a keyword array 540. One or more microservices 580 may be generated using information in the nanoservice array 520 and the keyword array 540.

Referring now to FIG. 6, an exemplary implementation of a processing device 600 is described according to the concepts described herein. The processing device 600 includes a processor 602, a volatile memory 604, a non-volatile memory 606 (e.g., hard disk) and the interface module 608 (e.g., a user interface, USB interface and so forth). The non-volatile memory 606 stores computer instructions 512, an operating system 516 and data 518. In one example, the computer instructions 512 are executed by the processor 602 out of volatile memory 604 to perform all or part of the processes described herein (e.g., process 300).

The process described herein (e.g., process 200, 300, and 400) is not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Figure 7A:
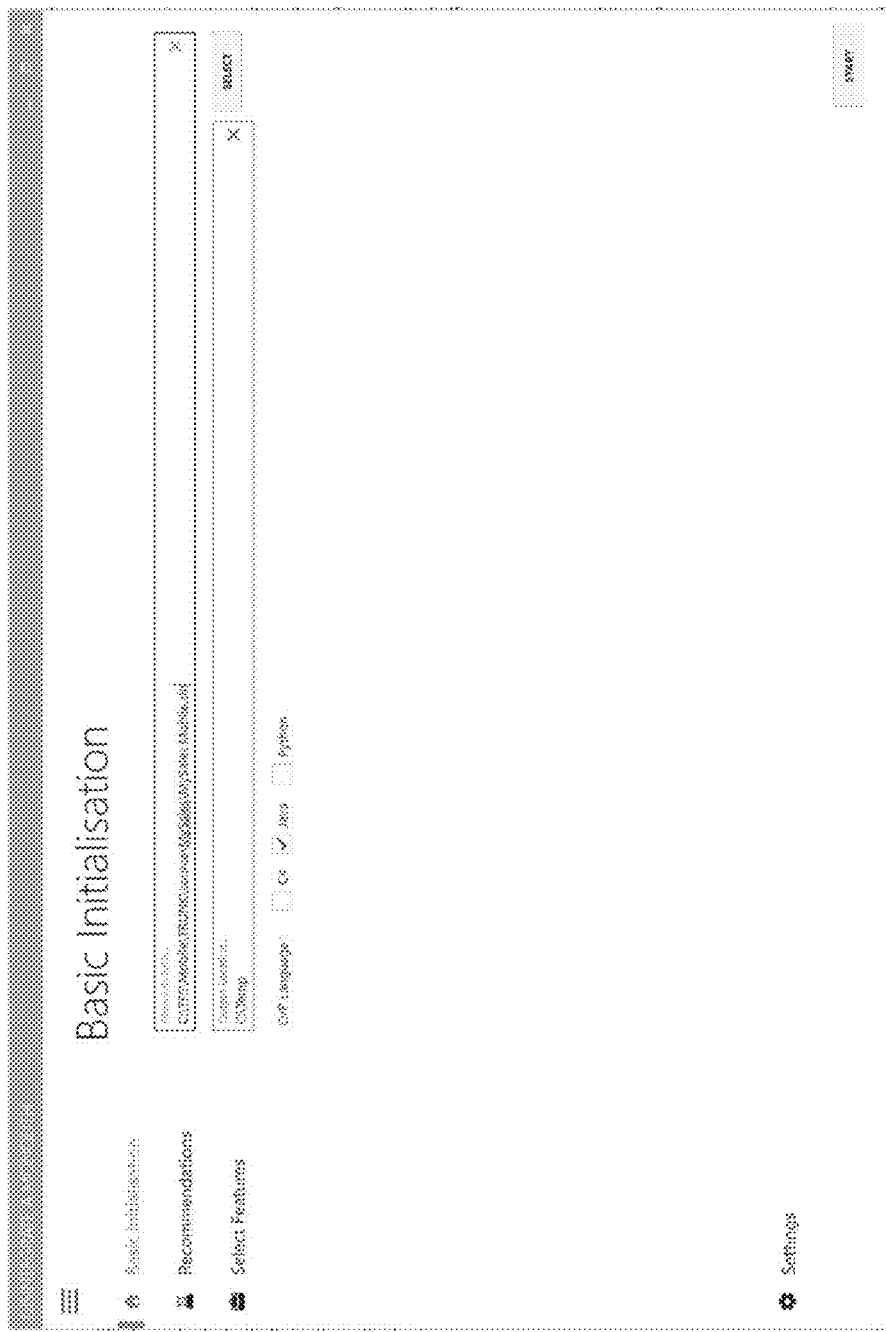
FIGS. 7A-7D are screenshots of an exemplary implementation of an application for disintegrating a monolith application into microservices according to the concepts described herein.
Figure 7B:
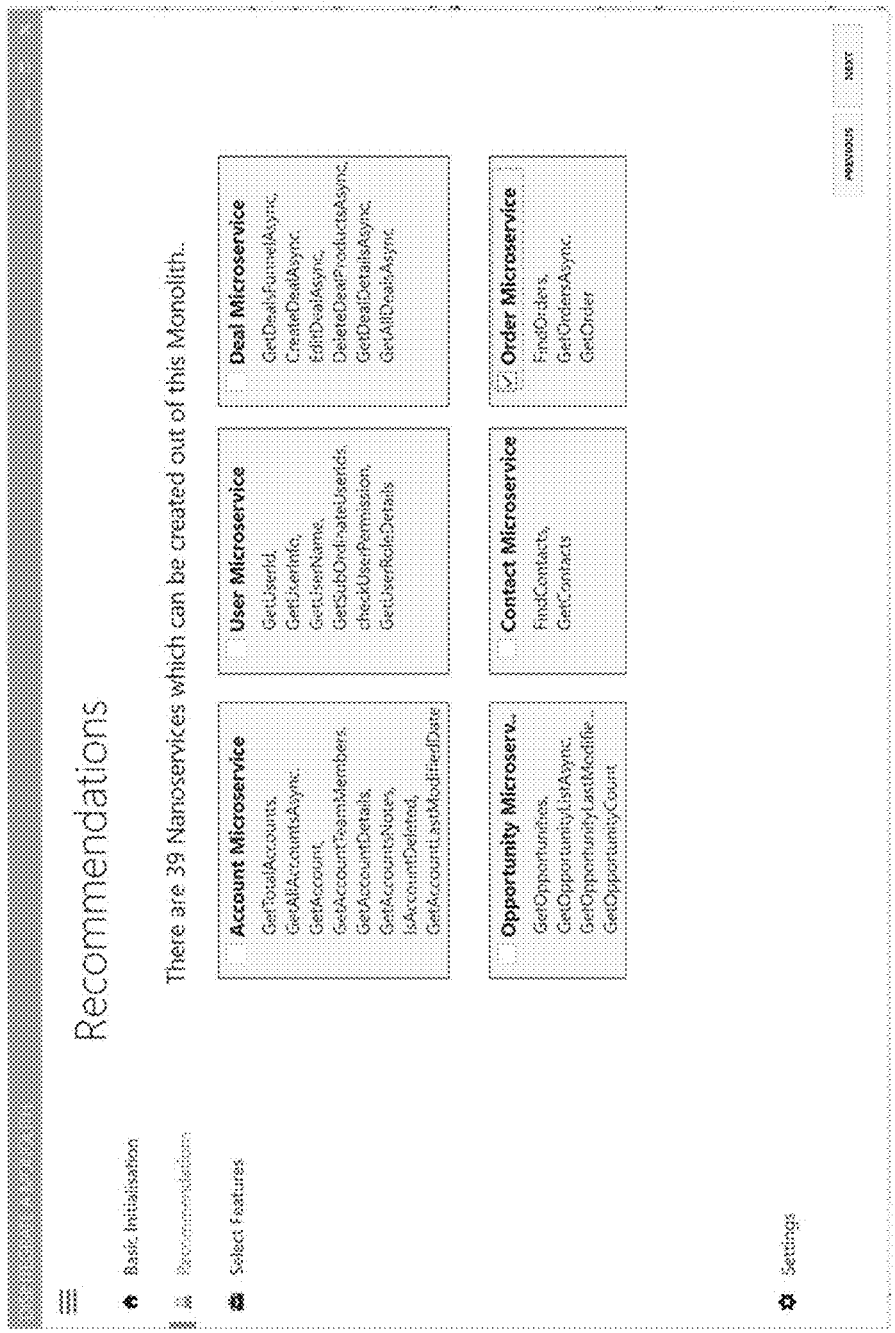
Figure 7C:
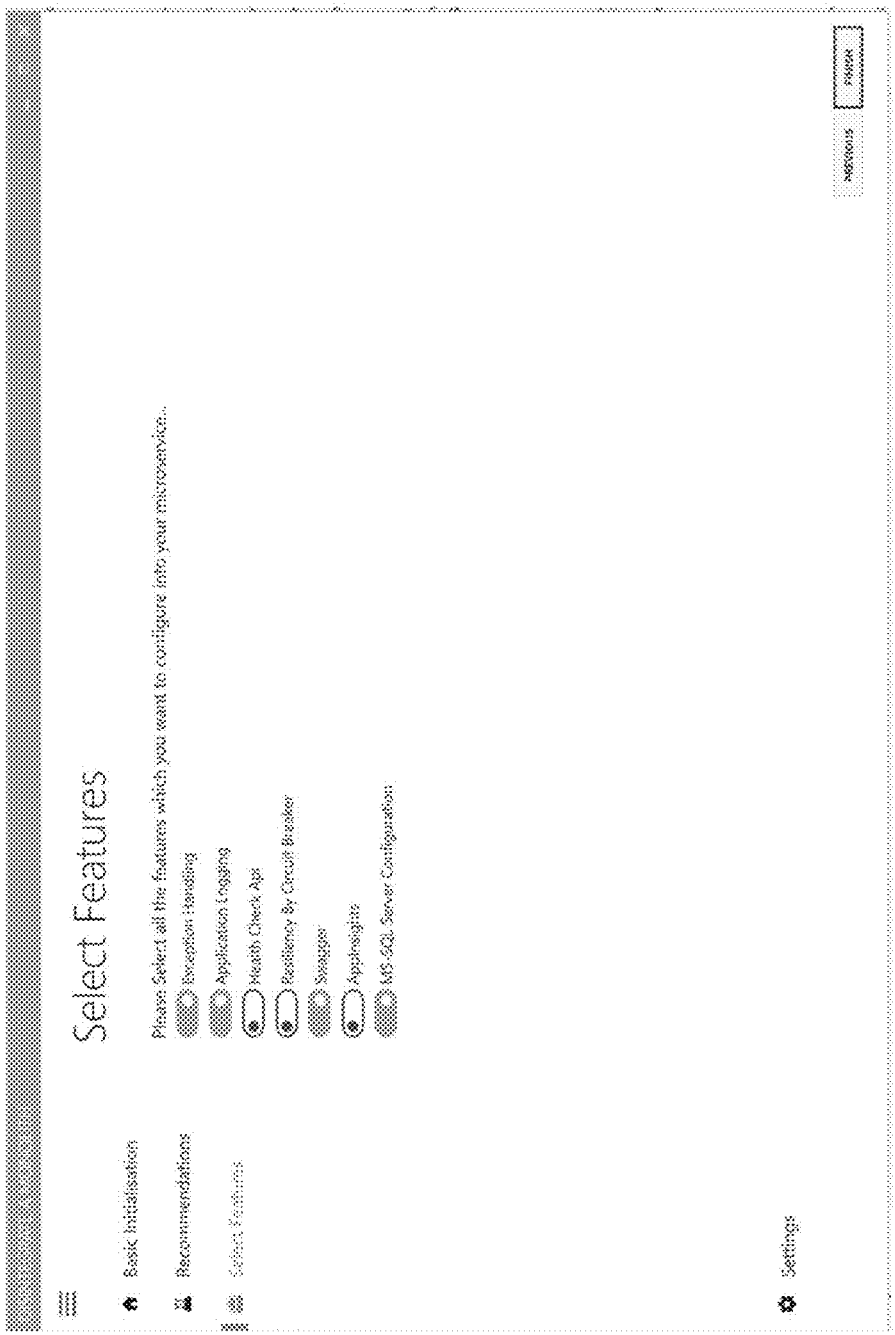
Figure 7D:
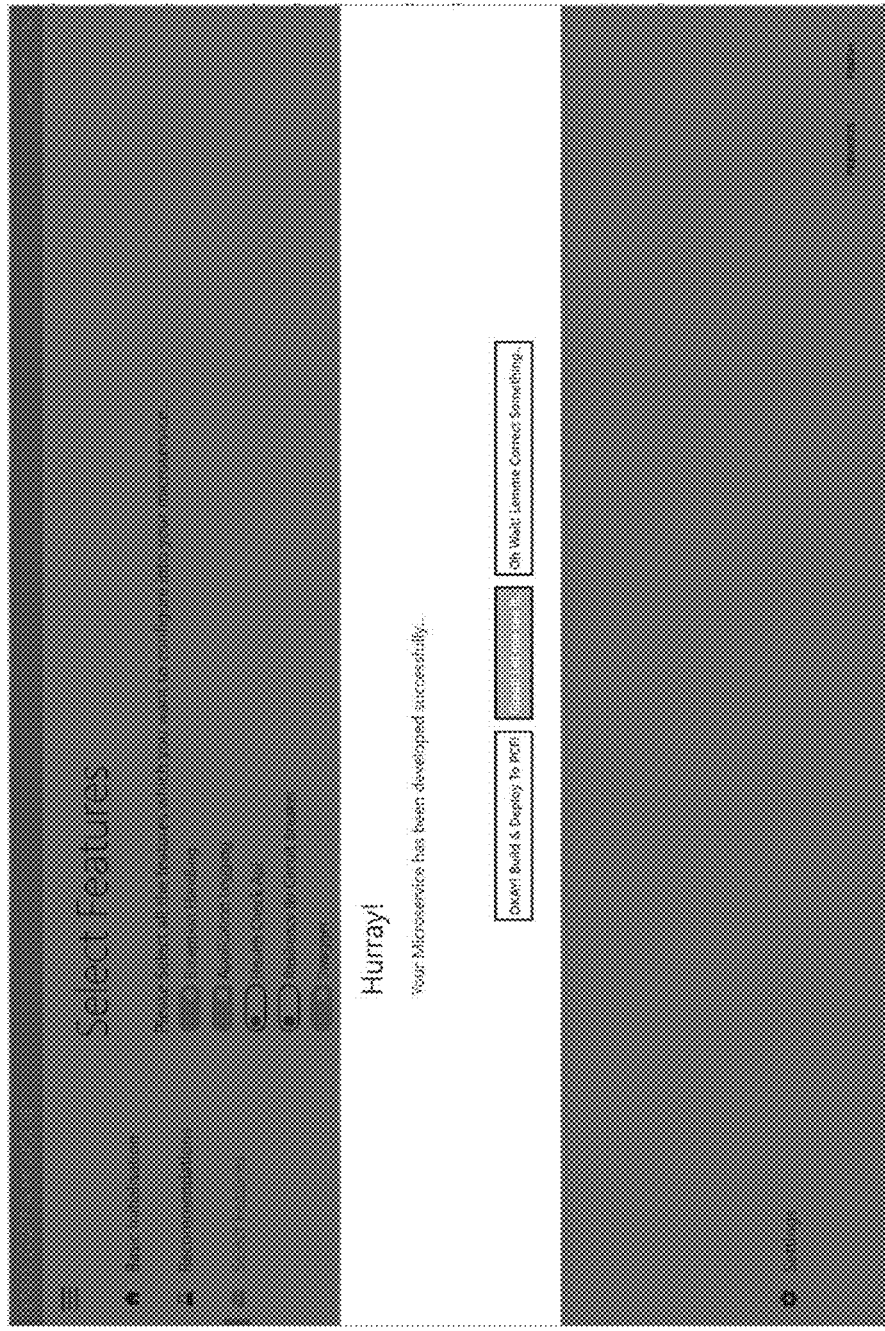

Referring now to FIGS. 7A-7D, screenshots of an exemplary implementation of an application for disintegrating a monolith application into microservices are presented according to the concepts described herein. Referring to FIG. 7A, the system 600 may receive a monolith application to be disintegrated. In this illustrative embodiment, the system receives a location where the codes of the monolith are stored and a location where the generated microservice is stored. However, as can be appreciated by those of ordinary skill in the pertinent art, there may be various way to configure how the system 600 works to receive a monolith application and to store output of the disintegration. Once the system receives the monolith application, it may perform the process described in steps 220-240 of process 200 in FIG. 2. After that, referring to FIG. 7B, the system 600 shows recommended microservices to a user. As shown in the screenshots, in this illustrative example, 39 nanoservices are found. Those 39 nanoservices are grouped into 6 microservice recommendations according to the keywords "Account," "User," "Deal," "Opportunity," "Contact," and "Order." With this user interface, the user may select one or more microservices to be generated. Referring now to FIG. 7C, the user may select additional generic microservice features to be added to the generated microservice. In this illustrative example, the user may select the features including: exception handling; application logging; api for service health check; resiliency by circuit breaker; providing automatic document generation via swagger; enabling application insights (performance data of the generated microservice); and database server configuration. However, as can be appreciated by those of ordinary skill in the pertinent art, the system may provide various other generic microservice features that can be selected the user. Referring now to FIG. 7D, the system 600 may generate at least one microservice and notify the result to the user. In this illustrative example, the system provides a plurality of options to the user including: deploying the generated microservice to PCF (Pivotal Cloud Factory, an open source cloud platform on which developers can build, deploy, run and scale applications); reviewing the output for the generated microservice; or correcting some configurations. However, as can be appreciated by those of ordinary skill in the pertinent art, the system may provide various other post-generation options that can be selected the user.

By using the concepts described herein, the time and effort to disintegrate a monolith application into microservices may be reduced since finding methods/keywords and finding nanoservices to recommend is automatically done by a system. In addition, the outcome from the system may be more reliable than the outcome by the humans because human errors are prevented. Furthermore, since the same approach is applied over the whole monolith application, code quality and consistency can be maintained even though the work is done by multiple teams or in multiple sessions. Accordingly, the system may enable the user to implement desired microservices with less effort, time, and cost.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A method for forming at least one microservice, the method comprising steps of:
   selecting a monolith application to disintegrate;
   scanning codes of the monolith application;
   identifying one or more methods from results of the scanning codes;
   finding one or more nanoservice candidates in the codes from the identified one or more methods, the one or more nanoservice candidates comprising the one or more methods that each reference an external service, the external service calling one of a web service, database interface, network protocol, or a combination thereof;
   recommending at least one microservice to a user, wherein the at least one microservice is a group of one or more selected ones of the nanoservice candidates sharing a common characteristic; and
   generating the at least one microservice selected among the at least one recommended microservice according to an input of the user,
   wherein the steps are performed by at least one processing device comprising a processor and a memory.

2. The method of claim 1, wherein the finding one or more nanoservices further comprises:
   determining whether each of the one or more methods references an internal method;
   storing a method, when the method does not call an internal method, into a reference array;
   determining whether each of the methods in the reference array calls an external service; and
   storing a method, when the method calls an external service, into a nanoservice array.

3. The method of claim 1, wherein the recommending at least one microservice further comprises:
   finding keywords in names of the nanoservice candidates;
   for each of the found keywords, determining whether a keyword exists in a keyword array;
   inserting, if the keyword does not exist in the keyword array, the keyword into the keyword array or increasing, if the keyword exists in the keyword array, a number of occurrences for the keyword in the keyword array;
   selecting at least one keyword as the selected keyword, wherein the number of occurrences for the selected keyword is greater than a predetermined number; and
   recommending the at least one microservice by grouping one or more selected nanoservices having the selected keyword.

4. The method of claim 1 further comprising:
   removing codes in the monolith application corresponding to the at least one generated microservice.

5. The method of claim 1 further comprising:
   proving a user interface with which a user selects at least one microservice among the at least one recommended microservice.

6. The method of claim 1 further comprising:
   adding one or more generic microservice features to the at least one generated microservice.

7. The method of claim 6, wherein the one or more generic microservice comprises at least one of:
   automatic deployment of the generated microservice,
   interfacing a database;
   performing a service health check;
   enabling exception handling;
   logging activities of the generated microservice;
   providing performance data of the generated microservice; and
   providing automatic document generation.

8. The method of claim 7, the getting a monolith application further comprising:
   getting a name of the monolith application and a location of the monolith application codes.

9. An apparatus for forming at least one microservice, the apparatus comprising:
   a processor and a memory, wherein the processor is configured to:
   select a monolith application to disintegrate;
   scan codes of the monolith application;
   identify one or more methods from results of the scanning codes;

find one or more nanoservice candidates in the codes from the identified one or more methods, the one or more nanoservice candidates comprising the one or more methods that each reference an external service, the external service calling one of a web service, database interface, network protocol, or a combination thereof;

recommend at least one microservice to a user, wherein the at least one microservice is a group of one or more selected ones of the nanoservice candidates sharing a common characteristic; and generate the at least one microservice selected among the at least one recommended microservice according to an input of the user.

10. The apparatus of claim 9 further comprising:
a user interface with which a user selects at least one microservice among the at least one recommended microservice.

11. The apparatus of claim 9 further comprising:
a user interface with which a user selects at least one generic microservice feature to be added to the at least one generated microservice.

12. The apparatus of claim 9, wherein the finding one or more nanoservices further comprises:
upon determining one or more of the methods in the reference array calls an external service, storing the one or more methods into a nanoservice array.

13. The apparatus of claim 12, wherein recommending at least one microservice further comprises:
finding keywords in names of the nanoservice candidates;
for each of the found keywords, determining whether a keyword exists in a keyword array;
inserting, if the keyword does not exist in the keyword array, the keyword into the keyword array or increasing, if the keyword exists in the keyword array, a number of occurrences for the keyword in the keyword array;
selecting at least one keyword as the selected keyword, wherein the number of occurrences for the selected keyword is greater than a predetermined number, and
recommending the at least one microservice by grouping one or more selected nanoservices having the selected keyword.

\* \* \* \* \*